United States Patent [19]

Bittner

[11] Patent Number: 4,707,056
[45] Date of Patent: Nov. 17, 1987

[54] OPTICAL ARRANGEMENT HAVING A CONCAVE MIRROR OR CONCAVE GRATING

[75] Inventor: Reinhold Bittner, Mögglingen, Fed. Rep. of Germany

[73] Assignee: Carl-Zeiss-Stiftung, Heidenheim, Fed. Rep. of Germany

[21] Appl. No.: 808,291

[22] Filed: Dec. 12, 1985

[30] Foreign Application Priority Data

Dec. 21, 1984 [DE] Fed. Rep. of Germany ....... 3446726

[51] Int. Cl.⁴ ................................................ G02B 6/10
[52] U.S. Cl. ............................. 350/96.12; 350/96.15; 356/326; 370/3; 351/176
[58] Field of Search ...................... 356/326; 350/96.12, 350/96.15; 370/3; 351/176

[56] References Cited

U.S. PATENT DOCUMENTS

| | | | |
|---|---|---|---|
| 2,847,899 | 8/1958 | Walsh | 356/326 |
| 3,617,109 | 11/1971 | Tien | 350/96.12 |
| 3,664,743 | 5/1972 | Kanda | 356/326 |
| 4,175,864 | 11/1979 | Gilby | 356/326 |
| 4,387,955 | 6/1983 | Ludman et al. | 370/3 |

OTHER PUBLICATIONS

Applied Optics/vol. 19, No. 21, Nov. 1980, Ryuichi Watanbe and Kiyoshi Nosu, Slab Waveguide Demultiplexer for Multimode Optical Transmission in the 1.0–1.4 μm Wavelength Region, pp. 3588 to 3589.

*Primary Examiner*—Eugene R. LaRoche
*Assistant Examiner*—Michael B. Shingleton
*Attorney, Agent, or Firm*—Walter Ottesen

[57] ABSTRACT

An optical arrangement for imaging a relatively small or slit-like surface is disclosed which includes a concave mirror or a concave grating. Astigmatism is corrected for the concave mirror or concave grating by mounting a slab waveguide at the surface which is to be imaged or at the image which is formed.

13 Claims, 8 Drawing Figures

OPTICAL ARRANGEMENT HAVING A CONCAVE MIRROR OR CONCAVE GRATING

FIELD OF THE INVENTION

The invention relates to an optical arrangement having a concave mirror or concave grating for forming an image of a relatively small or slit-like surface. Examples of such small surfaces are the entrance or exit surfaces of light-conducting fibers. On the other hand, such slit-like surfaces may be the entrance or exit slits of spectrometers. The preferred field of application of the invention is spectrometers, including the illumination device therefor, as well as multiplexers and demultiplexers for fiber optical data transmission.

BACKGROUND OF THE INVENTION

If the angle of incidence differs from zero, spherical concave mirrors exhibit an astigmatism that increases with the angle of incidence. Although this can be corrected by using toroidal or elliptical mirrors, such mirrors are complicated to manufacture and hence expensive. Spherical concave gratings exhibit this astigmatism as well, because their image forming properties are inherently similar to those of spherical concave mirrors. It is true that with holographically produced concave gratings, good possibilities are known for correcting astigmatism by suitably selecting the source points (see, for example, R. Bittner, Optik, Volume 64, page 185, 1983); however, because of their blaze angle, conventional gratings are capable of greater efficiency in the visible and infrared range of the spectrum, so that even today they are still highly important. Furthermore, with holographically produced concave gratings, the fixation of the source points for correcting image aberrations imposes great restrictions on the geometric arrangement of the grating, its entrance slit and its spectral plane, so that a greater degree of freedom in terms of correction possibilities would be advantageous.

SUMMARY OF THE INVENTION

It is an object of the invention to provide the simplest possible correction of astigmatism in concave mirrors and concave gratings, or in the case of holographically produced concave gratings to obtain a greater degree of freedom in terms of correction possibilities.

To form an image of a relatively small or slit-like surface, this object is attained in accordance with the invention by mounting a slab waveguide at the surface at which an image is formed, or is to be formed.

To correct further image aberrations, such as sagittal coma, it may be advantageous for the reflecting surfaces of the slab waveguide to be curved. It is particularly advantageous to embody the reflecting surfaces as concentric spherical surfaces.

Especially in the case of wavelength multiplexers, it is advantageous to dispose the reflecting surfaces wedgewise with respect to one another, in order to compensate for wavelength tolerances in the radiation sources.

One advantageous embodiment of the invention is characterized by an illumination device having a concave mirror and a source of illumination. With such a device, the slab waveguide makes it possible to carry a greater radiant flux from the source of illumination, for instance, into a light-conducting fiber.

Spectrometers having concave gratings are examples of other advantageous embodiments; because of the slab waveguide, considerable economy in terms of energy is attained.

Other advantageous embodiments include wavelength multiplexers and demultiplexers having a concave grating, in which the radiation is introduced and conducted away, for instance, by light-conducting fibers.

In advantageous embodiments, the concave grating is made up in a known manner of at least two zones, which are ruled using differently shaped diamond styluses. In this way, good energy conditions are attainable over a wide wavelength range.

Combining the device with a second one having a concave mirror or concave grating is particularly advantageous; then the same slab waveguide is used for both devices.

BRIEF DESCRIPTION OF THE DRAWINGS

The invention will now be described with reference to the drawing, wherein.

DESCRIPTION OF THE PREFERRED EMBODIMENTS OF THE INVENTION

Figure 1:
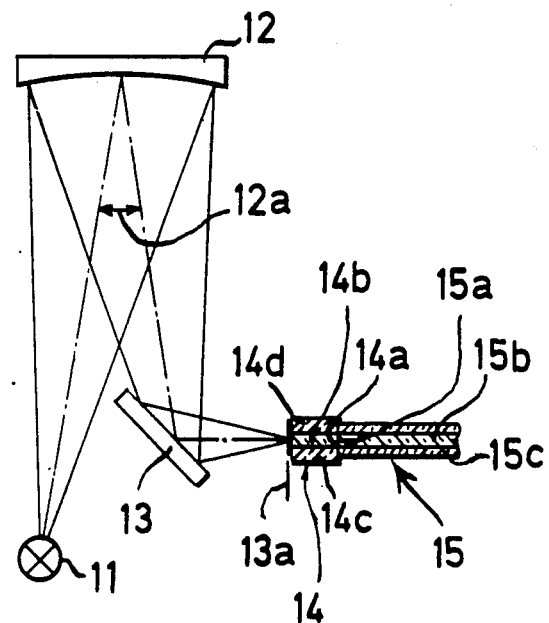
FIG. 1 shows an illumination device in which an image of a light source is introduced into a light-conducting fiber.

In FIG. 1, reference numeral 11 indicates a light source, such as a xenon lamp, an image of which is introduced into the light-conducting fiber 15 by the concave mirror 12 via the deflection mirror 13. The slab waveguide 14 is disposed before the entrance surface 15a of the light-conducting fiber 15.

The wave-guiding layer 14b of the slab waveguide 14 is of parallelepipedic configuration, and, in the plane of the drawing, it has a width 14a which is equal to the core diameter 15b of the light-conducting fiber 15. At right angles to the plane of the drawing, the slab waveguide has a height which is a multiple of the diameter of the core 15b of the fiber 15. The exact height is not of critical importance, so long as a minimum height is adhered to. The wave-guiding layer 14b of the slab waveguide 14 is suitably located on a carrier plate 14c and is covered with a second plate 14d; both plates have a lower index of refraction than does the wave-guiding layer 14b. The index of refraction of the wave-guiding layer is suitably selected to be at least equal to the index of refraction of the core 15b of the fiber 15.

Because of the physics of the operation of the wave-guiding layer 14b, it is naturally also possible for 25 the wave-guiding layer 14b to be bounded by air, instead of by one or both plates 14c and 14d. Similarly, the cladding 15c of the wave-conducting fiber 15 can be replaced with air.

The operation of the slab waveguide 14 is demonstrated by the following exemplary figures: radius of the concave mirror 12: 100 mm, that is a focal length of 50 mm; diameter of the concave mirror 12: 40 mm; deflection angle 12a of the concave mirror: 19°. Without the slab waveguide 14, a point light source 11 would produce a figure of confusion, in the image plane 13a, having an expansion of approximately 2.3 mm at right angles to the plane of the drawing, and with a projection of approximately 65 µm into the plane of the drawing. By means of the slab waveguide 14 made of SF 10, having a length of 9.85 mm, this figure of confusion is reduced in the entrance surface 15a of the fiber 15 to approximately 56 µm at right angles to the drawing, corresponding to the thickness 14b of the slab waveguide. In other words, given a core diameter 15b of the fiber 15 of 50 µm, for example, and a xenon lamp as the light source, the radiant flux passing through the slab waveguide 14 into the light-conducting fiber 15 is greater by a factor of 30 than would be the case without the slab waveguide. The slab waveguide must have a height of at least 2.3 mm.

Naturally, it is also possible to use a toroidal concave mirror, for instance, which partially corrects the astigmatism, and to correct the remainder of the astigmatism with a slab waveguide. A similar principle applies to the following examples as well.

Since the slab waveguide is relatively thin—as the above exemplary numerical values indicate—and it would thus be difficult to manufacture it as an individual part, it is suitable to produce it in the manner described below, for example.

A thin, but still easily manipulative plate of the glass for the slab waveguide is glued or wringed in optical contact to the optically polished surface of the carrier plate 14c. The thin manipulative plate likewise has an optically polished surface. The glued or wringed plate is then ground down and polished until it is of the thickness desired for the slab waveguide. Then the covering plate 14d, if there is one, is glued or wringed in optical contact to this surface.

Another conceivable way of making the wave-guiding layer is by the method of ion implantation or ion exchange, which has recently become known and with which the index of refraction of glasses can be varied at the surface in a defined way and to a defined thickness. In this connection, reference may be made for example to the article by Lilienhof et al in Optics Communications, Volume 35, page 49 (1980).

Figure 2:
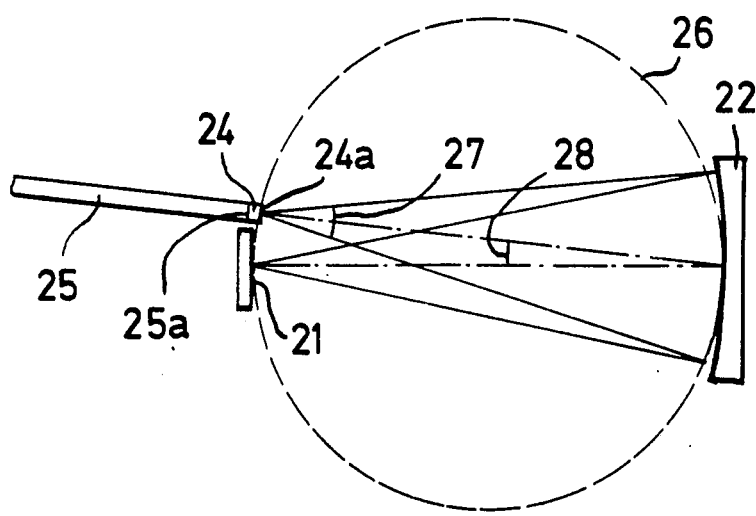
FIG. 2 shows a diode array spectrometer having a light-conducting fiber as its entrance slit.

FIG. 2 shows a diode array spectrometer having a light-conducting fiber 25 only the core of which is shown, and the end face 25a of which serves as the entrance slit for the spectrometer. Mounted against the end face 25a is the slab waveguide 24, of which likewise only the wave-guiding layer is shown and which again has a width in the plane of the drawing that is equal to the core diameter 25a of the light-conducting fiber 25. A concave grating 22 serves as the dispersing element and a diode array 21 is used as the receiver. In a known manner, the concave grating 22, the diode array 21 and the entrance slit 25a, or the end face 24a of the slab waveguide 24, are located on the Rowland circle 26.

The operation of the slab waveguide 24 is demonstrated by the following exemplary numerical values: radius of the concave grating 22: 200 mm, that is, diameter of the Rowland circle 26: 200 mm; diameter of the concave grating: 80 mm; entrance opening 27: 1:2.5; angle of incidence 28: 5.16°; groove density of the concave grating: 150 lines per mm; wavelength range: 400 to 800 nm; length of spectrum on the receiver 21: 12 mm. Without the slab waveguide 24, a point in the plane of the entrance slit 25a (if it is located on the Rowland circle 26) would produce on the receiver surface 21 a figure of confusion measuring 0.63 mm in the groove direction (that is, at right angles to the plane of the drawing). By means of the slab waveguide 24 of SF 10 having a length of 2.74 mm, this value is reduced to 4.3 µm. Since conventional diode arrays have a spread of 25 µm in the groove direction, a radiant flux that is greater by a factor of 20 is received by the receiver through the slab waveguide 24. In the dispersion direction, the figure of confusion of a maximum size of 36 µm is (mathematically) convoluted with the thickness of the slab waveguide; in other words, the figure of confusion can be kept below the limit of resolution of conventional diode arrays.

Figure 3:
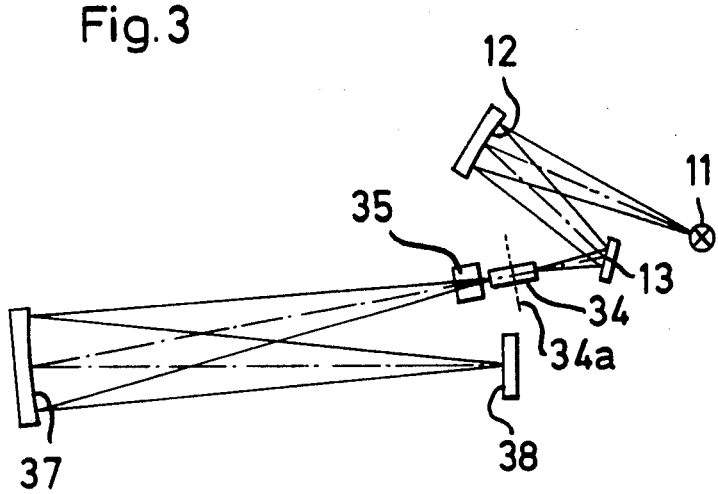
FIG. 3 shows a diode array spectrometer having an illumination device and a cuvette.

FIG. 3 shows a complete diode array spectrometer, with an illumination device and a cuvette. The illumination device corresponds to the one shown in FIG. 1, wherein the image of the light source 11 is imaged into the plane 34a, which is located immediately before the cuvette 35. The slab waveguide 34 is disposed before and after the plane 34a. The portion of the waveguide 34 located ahead of the plane 34a (viewed in the direction of the light) effects the image correction for the illumination part; whereas, the portion of the slab waveguide 34 located after the plane 34a effects the image correction for the following spectrometer part which includes the concave grating 37 and the diode array 38. In this manner, two image forming systems can be corrected with one slab waveguide. In this connection, one must accept that an anamorphotic illumination occurs in the cuvette 35; that is, in the cuvette, the beam of light has a greater spread at right angles to the plane of the drawing than in the plane of the drawing. In many applications, this is not a disadvantage. For instance, if the measurement chamber of the cuvette intersects the path of the rays, this merely causes a slight energy loss, which is often acceptable.

Figure 4:
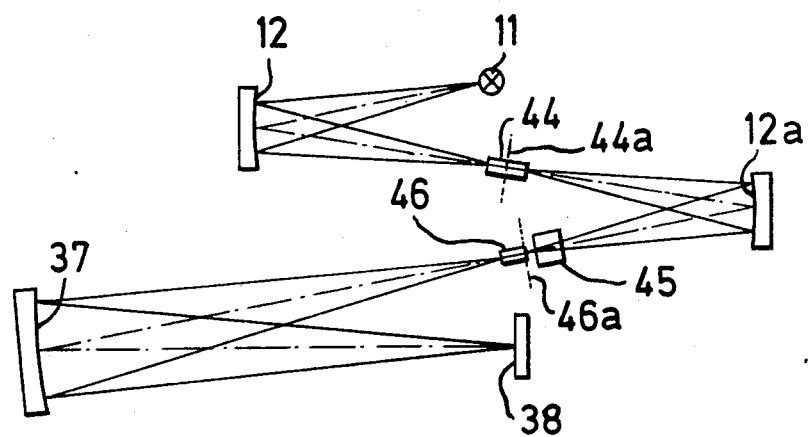
FIG. 4 shows a diode array spectrometer having a different embodiment of the illumination device.

For applications in which it is necessary or advantageous for the spread of the beam of light in the cuvette to be the same in all directions, FIG. 4 shows a modified realization of the illumination device. Here the image of the light source 11 imaged by the first concave mirror 12 into the plane 44a is imaged by the second concave mirror 12a into the plane 46a immediately behind the cuvette 45. The same slab waveguide 44 is used for both image forming systems of the illumination device. For the following spectrometer part, which again includes the concave grating 37 and the receiver 38, the slab waveguide 46 is provided for correcting astigmatism and is mounted against the plane 46a. The cuvette 45 is located directly in front of this plane; thus, for a point light source 11, the beam of light in the cuvette 45 has the same spread at right angles to the plane of the drawing as in the plane of the drawing.

Figure 5:
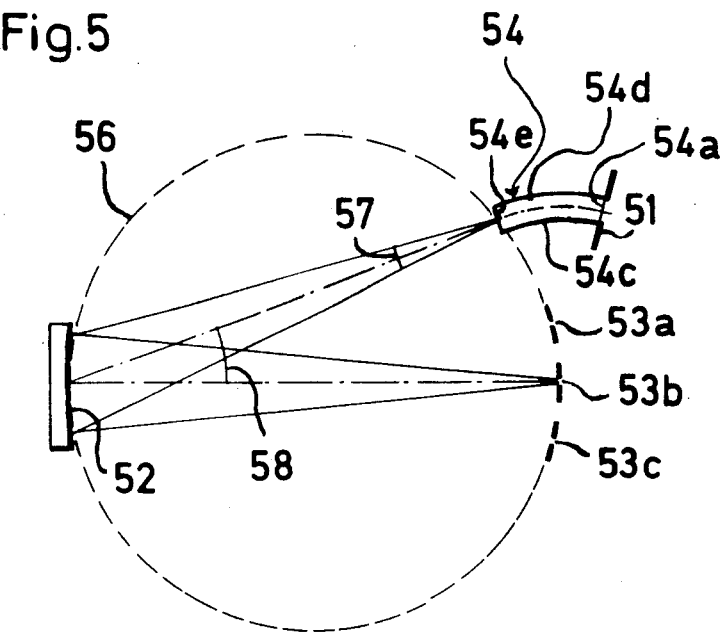
FIG. 5 shows a spectrometer having one entrance slit and a plurality of exit slits.

FIG. 5 shows a spectrometer having an entrance slit 51 and a plurality of exit slits 53a, 53b, 53c, as an example for a slab waveguide having curved reflecting surfaces. The concave grating 52 and the exit slits 53a, 53b, 53c are again located on the Rowland circle 56. Conventionally, the entrance slit 51 would be located on the Rowland circle 56 as well; however, with the slab waveguide used in accordance with the invention, the end 54e of the slab waveguide is located on the Rowland circle 56, and the entrance slit 51 is located directly ahead of the beginning 54a of the slab waveguide 54. The reflecting surfaces 54c and 54d are concentrically curved circular surfaces, the common center point of which is located on the Rowland circle 56, approximately in the middle of the spectrum used. In this manner, in addition to the correction of astigmatism, a correction of sagittal coma is also attained.

The realization of the slab waveguide 54 is illustrated by the following exemplary numerical values: radius of the concave grating 52: 200 mm, that, diameter of the Rowland circle 56: 200 mm; diameter of the concave grating: 40 mm; entrance opening 57: 1:5; angle of incidence 58: 21.1°; groove density of the concave grating: 600 lines per mm; wavelength range 400 to 800 nm; length of spectrum on the Rowland circle 56: 48 mm. Without the slab waveguide 54, a point in the plane of the entrance slit 51 (if it is located on the Rowland circle 56) would produce in the plane of the slits 53a, 53b, 53c a figure of confusion measuring 5.56 mm in the groove direction (that is, at right angles to the plane of the drawing). This measurement is reduced to 93 $\mu$m by means of a parallelepipedic-shaped slab waveguide of PSK 3 and having a length of 43.09 mm. By means of the slab waveguide 54 shown in FIG. 5, having two concentric spherical surfaces 54c and 54d with a radius of curvature of 73 mm and an arc length of 41.0 mm, a further reduction of the figure of confusion takes place of from 93 $\mu$m to 2.5 $\mu$m in the groove direction and from 52 $\mu$m to 7.9 $\mu$m in the dispersion direction. The thickness of the slab waveguide is suitably selected to be equal to the width of the entrance slit, that is, 10 $\mu$m, for example.

It is known that the astigmatism of holographic concave gratings can be corrected by suitably selecting the source points when the holographic gratings are produced. However, this usually results in relatively small angles between the incident direction and the normal to the grating or spectrum and thus results in geometric arrangements that are often unfavorable in terms of practical realization. By using a waveguide at the entrance slit of the spectrometer, it is possible—as shown in the embodiment of FIG. 6—to widen the angle between the entrance slit 61 and the spectrum 63 without impairing the astigmatism correction.

Figure 6:
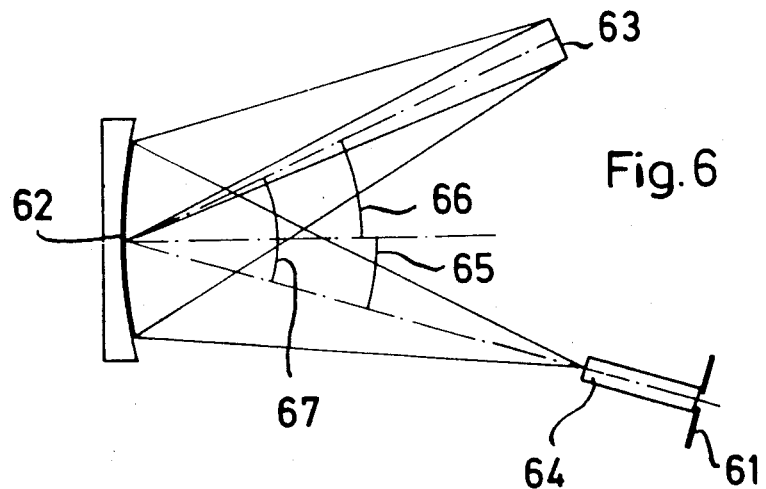
FIG. 6 shows a spectrometer having a holographic concave grating.

In FIG. 6, a holographic concave grating 62 is shown onto which the radiation arriving from the entrance slit 61 falls at an angle 65 of 15.5° to the normal of the grating, with the large entrance opening of 1:2.5. The radiation reflected by the concave grating 62 has an angle 66 of 24° to the normal of the grating, for the middle of the wavelength range of from 360 to 780 nm; the spectrum in the plane 63 has a length of 3.2 mm. Thus the total deflection angle 67 is 39.5°, which is thus substantially larger than the maximum deflection angle of 20° that can be attained with known astigmatism correction for holographic gratings. The effect of the slab waveguide 64 for the deflection angle of 39.5° shown in FIG. 6 is illustrated by the following exemplary numerical values: concave grating radius: 29.078 mm; concave grating diameter: 11.1 mm; mean groove density of the concave grating: 246.5 lines per mm; entry intersection length: 27.77 mm; exit intersection length: 27.77 mm. By means of the slab waveguide 64 of SF 10 having a length of 6.9 mm, for a point in the plane of the slit 61, the figure of confusion in the plane of the spectrum 63 at right angles to the plane of the drawing is reduced from 1.4 mm to 28 $\mu$m; in the dispersion direction, a figure of confusion of a maximum of 75 $\mu$m is obtained.

Figure 7:
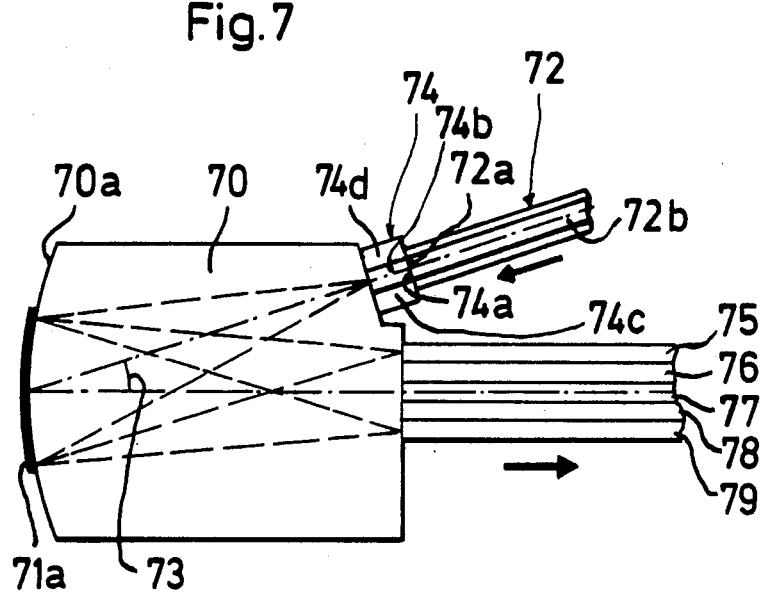
FIG. 7 shows a wavelength demultiplexer.

FIG. 7 shows, as a further exemplary embodiment, a demultiplexer for fiber optical data transmission. For the sake of being both compact and sturdy, such demultiplexers are at present often made from a glass or plastic body, which either contains the required optical components or has these components glued onto it. If standard concave gratings are used, so that the structure will be as simple as possible, then the optical properties will be unsatisfactory because of the astigmatism of the concave grating.

In FIG. 7, a glass or plastic body 70 is shown, onto the convex surface 70a of which the concave grating 71a has been copied and provided with a mirror layer, using known technology. The radiation that is to be divided up is guided to the demultiplexer via the light-conducting fiber 72, the core 72b of which has a diameter of 50 $\mu$m, for instance. A slab waveguide 74 is mounted between the end 72a of the light-conducting fiber 72 and the glass or plastic body 70. The wave-guiding layer 74b of waveguide 74 has the same thickness 74a in the plane of the drawing as does the core 72b of the light-conducting fiber 72. At right angles to the plane of the drawing, the parallelepipedic-shaped wave-guiding layer 74b has a substantially greater spread which is not critical so long as a minimum value is adhered to. In the present case, by way of example, the wave-guiding layer 74b is made of SF 10 and is located between the glass plates 74c and 74d made of F2.

The radiation coming from the light-conducting fiber 72 travels through the slab waveguide 74 and reaches the concave grating 71a, which breaks it up into its individual wavelengths, which are received by the light-conducting fibers 75 to 79. These light-conducting fibers have a core diameter of 200 $\mu$m, for example, so that slight shifts in the wavelengths (for instance, resulting from tolerances on the part of the emitting diodes) and slight tolerances in the overall structure of the demultiplexer are compensated for.

The effect of the slab waveguide 74 is illustrated by the following exemplary numerical values: material of the glass body 70: SF 10; concave grating radius: 63.551 mm; grating diameter: 17.3 mm; groove density: 248 lines per mm; linear dispersion: 107.64 nm/mm; entrance intersection length: 62.3 mm; exit intersection length: 63.5 mm; angle of incidence 73: 11.38°; wavelength range: 1100 to 1600 nm with 17 channels. By means of the slab waveguide 74 having a length of 2.52 mm and a height of at least 0.74 mm, the figure of confusion having a spread of 0.69 mm in the groove direction is reduced to 13 $\mu$m. As a result, a radiant flux which is greater by a factor of 3.7 reaches the exit light-conducting fibers.

In an advantageous embodiment, the concave grating 71a comprises three zones located adjacent one another, for example, in a known manner (see M. C. Hutley, Diffraction Gratings, London, 1982, for example), which are ruled using variously shaped diamond styluses, so that the change in the blaze wavelength that is dictated by the curvature of the concave grating is reduced to $\frac{1}{3}$.

Figure 8:
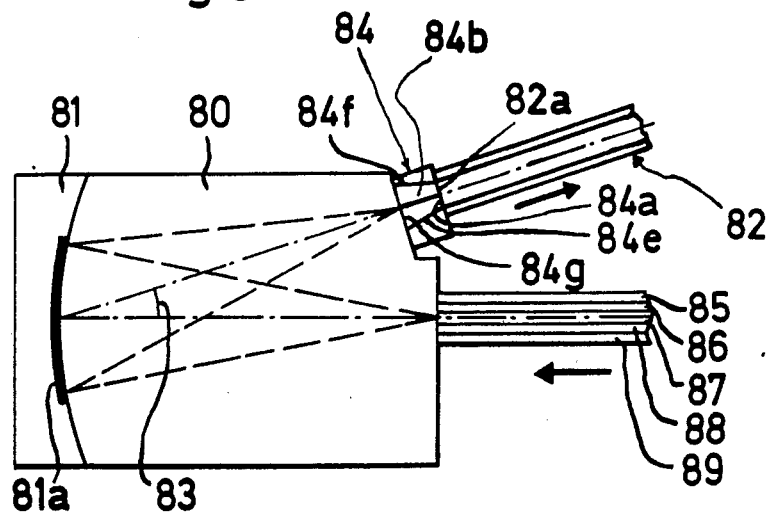
FIG. 8 shows a wavelength multiplexer.

As the last exemplary embodiment, FIG. 8 shows a multiplexer. Here, the concave grating 81a, in another known embodiment, is copied onto a separate part 81 and is then cemented together with this separate part onto the glass or plastic body 80. All the radiation, having various wavelength ranges, that enters through the light-conducting fibers 85 to 89 is imaged by the concave grating into the exit fibers 82. The slab waveguide 84 is located between the glass or plastic body 80 and the exit light-conducting fiber 82. Even with a wave-guiding layer in the shape of a parallelopiped, the slab waveguide 84 brings about a substantial improvement in the image forming properties of the concave grating.

In the exemplary embodiment shown in FIG. 8, the reflecting surfaces 84e and 84f of the slab waveguide 84b have a wedge-like configuration with respect to one another; the distance 84a between these surfaces 84e and 84f at the end of the slab waveguide is equal to the core diameter 82a of the exit light-conducting fiber 82. Because of this wedge-like configuration of the reflecting surfaces, not only can tolerances in the dimensions of all the optical parts be taken up, but also tolerances in the wavelength ranges of the individual radiations coming through the entry light-conducting fibers can be taken up without having to increase the core diameter of the exit light-conducting fiber beyond the conventional or advantageous amount.

The effect of the slab waveguide for this embodiment is demonstrated by the following exemplary numerical values: material of the glass body 80: SF 10; concave grating radius=entry intersection length: 50.845 mm; grating diameter: 9.55 ; groove density: 183.13 lines per mm; linear dispersion: 182.2 nm/mm; exit intersection length: 50.302 mm; angle of emergence 83: 8.38°; wavelength range: 1100-1600 nm with 17 channels; and, core diameter of the entry light-conducting fibers: 10 μm. By means of a parallelepipedic-shaped slab waveguide of SF 10 having a length of 1.091 mm and a minimum height of 0.25 mm, the figure of confusion in the groove direction is reduced from 0.2 mm to 0.6 μm. As a result, a radiant flux that is greater by a factor of 4 enters the exit light-conducting fibers. By means of the conical configuration of the slab waveguide 84, with a width of 50 μm on the fiber side 84a and 100 μm on the grating side 84g, the wavelength tolerance per channel is increased from 6.8 nm to 15.9 nm.

It is understood that the foregoing description is that of the preferred embodiments of the invention and that various changes and modifications may be made thereto without departing from the spirit and scope of the invention as defined in the appended claims.

What is claimed is:
1. An optical arrangement comprising:
    light-receiving means having a receiving surface for receiving reflected light thereon;
    concave reflecting means for reflecting light from an object surface to form an image thereof on said receiving surface; and,
    a slab waveguide disposed directly adjoining one of said surfaces for correcting any astigmatism associated with said reflecting means.
2. The optical arrangement of claim 1, said slab waveguide having a wave-guiding layer and two reflecting surfaces bounding said wave-guiding layer, said concave reflecting means being selected from the group consisting of a concave mirror and a concave grating.
3. The optical arrangement of claim 1, said slab waveguide having a wave-guiding layer and two reflecting surfaces bounding said wave-guiding layer, said reflecting surfaces being curved surfaces.
4. The optical arrangement of claim 3, said reflecting surfaces being concentric spherical surfaces.
5. The optical arrangement of claim 2, said wave-guiding layer being configured so as to cause said reflecting surfaces to conjointly define a wedge.
6. The optical arrangement of claim 1, wherein the optical arrangement is an illuminating device comprising a light source, said reflecting means being a concave mirror for reflecting the light coming from said light source and being part of said illuminating device.
7. The optical arrangement of claim 1, wherein the optical arrangement is a spectrometer and said reflecting means being a concave grating and forming part of said spectrometer.
8. The optical arrangement of claim 1, wherein the optical arrangement is a wavelength multiplexer and said reflecting means is a concave grating forming part of said wavelength multiplexer.
9. The optical arrangement of claim 8, said concave grating including at least two zones ruled by two diamond styluses, respectively, said styluses being formed differently from one another.
10. The optical arrangement of claim 1, wherein the optical arrangement is a wavelength demultiplexer and said reflecting means is a concave grating forming part of said wavelength demultiplexer.
11. The optical arrangement of claim 10, said concave grating including at least two zones ruled by two diamond styluses, respectively, said styluses being formed differently from one another.
12. The optical arrangement of claim 1, comprising second concave reflecting means for coacting with said first-mentioned concave reflecting means; and, said slab waveguide being disposed between said first and second reflecting means for effecting imaging corrections for both of said reflecting means.
13. The optical arrangement of claim 1, comprising a light-conducting fiber disposed at one of said surfaces next to said slab waveguide, the index of refraction of the wave-guiding layer of said slab waveguide and the index of refraction of the core of said light-conducting fiber being substantially the same.

* * * * *

UNITED STATES PATENT AND TRADEMARK OFFICE
CERTIFICATE OF CORRECTION

PATENT NO. : 4,707,056
DATED : November 17, 1987
INVENTOR(S) : Reinhold Bittner

It is certified that error appears in the above-identified patent and that said Letters Patent is hereby corrected as shown below:

In column 2, line 62: delete "25".

In column 7, line 27: delete "9.55;" and substitute -- 9.55 mm; -- therefor.

Signed and Sealed this

Twenty-second Day of March, 1988

Attest:

DONALD J. QUIGG

*Attesting Officer*            *Commissioner of Patents and Trademarks*